US005284350A

United States Patent [19]

Geiger et al.

[11] Patent Number: 5,284,350

[45] Date of Patent: Feb. 8, 1994

[54] FOLDABLE WHEELCHAIR AND SIDE FRAME ASSEMBLY

[75] Inventors: Richard Geiger, Alameda; A. Scott Robertson; Neville Page, both of San Francisco, all of Calif.

[73] Assignee: Medical Composite Technology, Soquel, Calif.

[21] Appl. No.: 886,850

[22] Filed: May 22, 1992

[51] Int. Cl.[5] .............................................. B62M 1/14

[52] U.S. Cl. ................................ 280/250.1; 280/650; 280/657

[58] Field of Search .................... 280/304.1, 250.1, 39, 280/644, 42, 649, 650, 657, 47.4; 297/DIG. 4

[56] References Cited

U.S. PATENT DOCUMENTS 3,337,261 8/1967 Nihlean et al. .
4,082,348 4/1978 Haury .
4,101,143 7/1978 Sieber .
4,166,631 9/1979 Sanaski .
4,350,227 9/1982 Knoche .
4,351,540 9/1982 Minnebraker .
4,428,594 1/1984 Minnebraker .
4,477,098 10/1984 Minnebraker .
4,489,955 12/1984 Hamilton .
4,572,576 2/1986 Minnebraker .
4,592,570 6/1986 Nassiri .
4,593,929 6/1986 Williams .
4,595,212 6/1986 Haury et al. .
4,598,921 7/1986 Fenwick ......................... 280/657 X
4,648,619 3/1987 Jungnell et al. .
4,676,519 6/1987 Meier .
4,693,490 9/1987 Loodberg et al. .
4,721,321 1/1988 Haury et al. .
4,730,842 3/1988 Summers et al. ............... 280/657 X
4,768,797 9/1988 Friedrich .
4,770,432 9/1988 Wagner .
4,813,693 3/1989 Lockhard et al. .............. 280/657 X
4,840,390 6/1989 Lockard et al. .
4,852,899 8/1989 Kueschall ....................... 280/657 X
4,887,826 12/1989 Kantner .
4,917,395 4/1990 Gabriele .
5,076,602 12/1991 Robertson et al. .......... 280/250.1 X
5,131,672 7/1992 Robertson et al. .............. 280/250.1
5,143,391 9/1992 Robertson et al. .............. 280/250.1
5,152,543 10/1992 Sims et al. ........................ 280/250.1

FOREIGN PATENT DOCUMENTS 0268960 6/1988 European Pat. Off. ......... 280/304.1

*Primary Examiner*—Brian L. Johnson
*Attorney, Agent, or Firm*—Burns, Doane, Swecker & Mathis

[57] ABSTRACT

A foldable wheelchair having a folding mechanism connecting two side frame assemblies to each other. The side frame assembly supports a castor frame piece, pivoting shafts of the folding mechanism, drive wheel axles and a seat back tube. The side frame assemblies are made of two halves that are secured together and may be fabricated from compression or injection molded composite plastics. The seat angle is adjusted by pivoting the side frame assemblies around a pivot point located in an upward and forward region of the side frame assembly.

25 Claims, 6 Drawing Sheets

FOLDABLE WHEELCHAIR AND SIDE FRAME ASSEMBLY

FIELD OF THE INVENTION

The present invention relates to wheelchairs and particularly to foldable wheelchairs and side frame assemblies for foldable wheelchairs.

BACKGROUND

In numerous public places, and especially at places such as airports and hospitals, there repeatedly arises the need to meet the short-term transportation requirements of the ill, handicapped, elderly or otherwise infirm. For many years, the foldable wheelchair has met that need. Its typically lighterweight design and typically all-purpose utility has made the foldable wheelchair readily available for use in virtually all situations encountered in those environments. Furthermore, the foldable design has enabled efficient storage of the wheelchair when not in use, a feature especially important where it is vital to keep hallways and other thoroughfares free and clear for other traffic.

However, in recent years, where awareness and sensitivity to meeting the transportation needs of the infirm has increased, it has been discovered that the designs of prior art foldable wheelchairs, while still better suited than non-folding wheelchairs, are deficient in many respects. For example, the prior art designs are rather bulky and unwieldy and not sufficiently adaptable to the comforts of the user. Hence, a need has arisen to maintain and enhance the attractive characteristics of the foldable wheelchair design such as quick deployment and efficient storage, while improving other characteristics by trimming weight and adding greater adjustability to more adequately address the comforts of the user.

OBJECTS AND SUMMARY

It is therefor an object of the present invention to provide a foldable wheelchair design that offers quick deployment and efficient storage characteristics and improvements over the prior art designs.

It is an object of the present invention to provide a foldable wheelchair design that is lightweight yet sufficiently durable for repeated use in a wide variety of situations.

It is an object of the present invention to provide a foldable wheelchair design offering increased adjustability to meet the particular needs and comforts of the user.

It is an object of the present invention to provide a foldable wheelchair design that offers improvements over the prior art yet is economically produced.

It is an object of the present invention to provide a design for a side frame assembly for a foldable wheelchair that is durable for repeated use in a wide variety of situations.

It is an object of the present invention to provide a design for a side frame assembly for a foldable wheelchair that offers increased adjustability to meet the particular needs and comforts of the user.

These and other objects not specifically listed are fulfilled by a foldable wheelchair having a pair of side assemblies that are connected to each other by a means for folding. The side frame assemblies each include a first and second pivot attachment region for connecting the side frame assemblies to the means for folding wherein the first pivot attachment region is at an upper middle region of the side assembly and the second pivot attachment region is at a lower middle region of the side assembly.

The foldable wheelchair also has a seat assembly spanning the distance between the side frame assemblies. A means for supporting the seat assembly is disposed at a top region of each side assembly.

The means for folding includes a pair of shafts connected to each other at a common pivot point centrally located on the shafts. One of the shafts is pivotally attached to the first pivot attachment region of a side assembly and extends across the distance between the pair of side frame assemblies to one side of the seat assembly. The other shaft is pivotally attached to the first pivot attachment region of the other side assembly and extends across the distance between the pair of side frame assemblies to an opposite side of the seat assembly. The means for folding also includes a of pivot links, each of which is pivotally attached to the second pivot attachment region of a respective side assembly and extends to a corresponding shaft of the means for folding.

These and other objects not specifically listed are fulfilled by a side assembly of a foldable wheelchair frame having means for receiving a drive wheel axle at any of a plurality of different locations in a rearward region of the side assembly such that a height and a center of gravity of the side assembly relative to the drive wheel axle may be varied. The side assembly also includes means for supporting a wheelchair seat assembly at a top region of the side assembly and a means for pivotally attaching and fixing a caster frame piece to the side assembly such that a seat angle may be varied relative to a ground surface.

A pair of pivot attachment regions are provided for attaching a folding mechanism to the side assembly. One of the pair is disposed at an upper middle region of the side assembly and the other of the pair is disposed at a lower middle region of the side assembly.

BRIEF DESCRIPTION OF THE DRAWINGS

Preferred embodiments of the present invention will be described with reference to the accompanying drawing figures, wherein like reference numerals refer to like items and wherein.

DESCRIPTION

Figure 1:
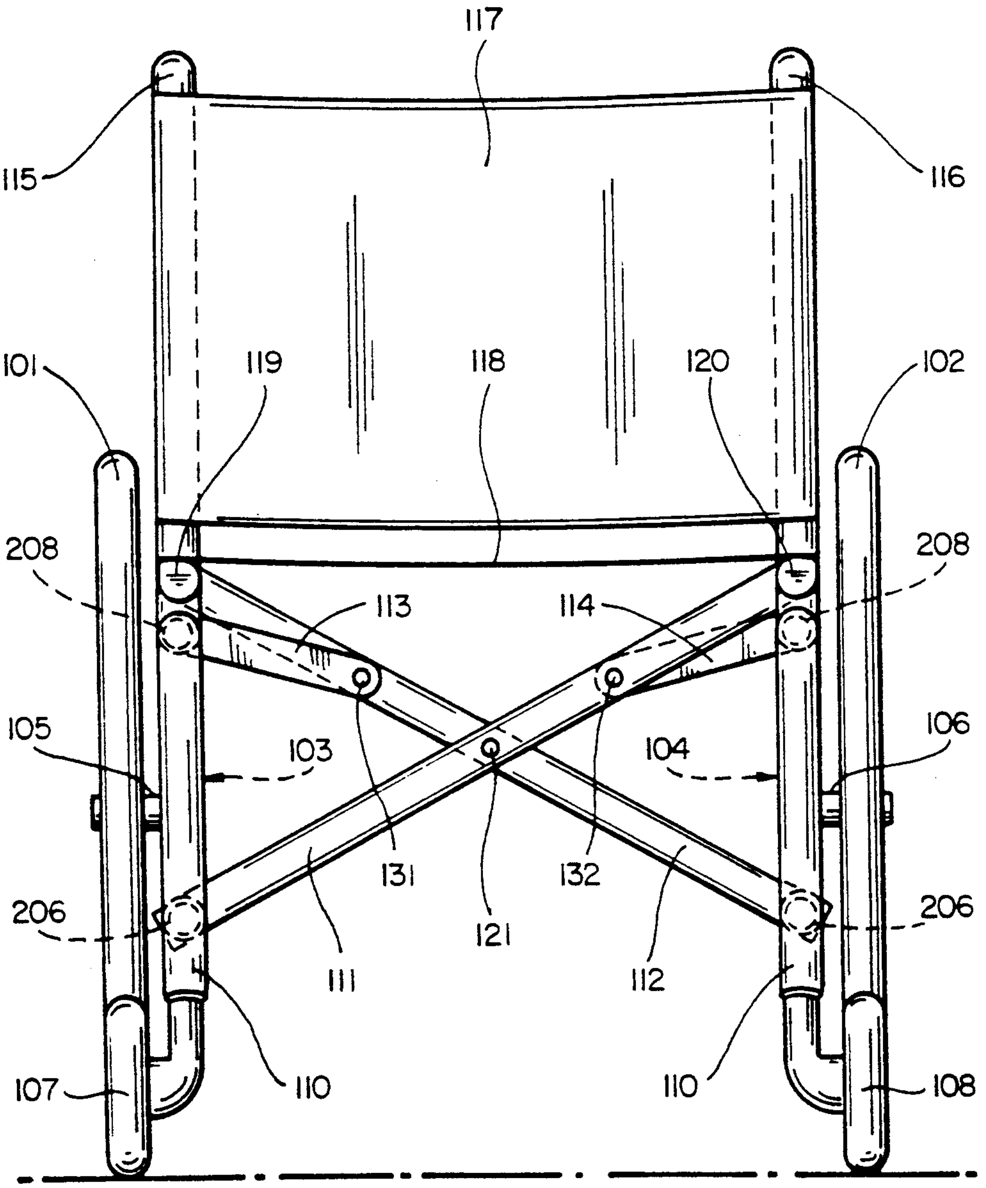
FIG. 1 is a front view of a foldable wheelchair in accordance with a preferred embodiment of the present invention.
Figure 2:
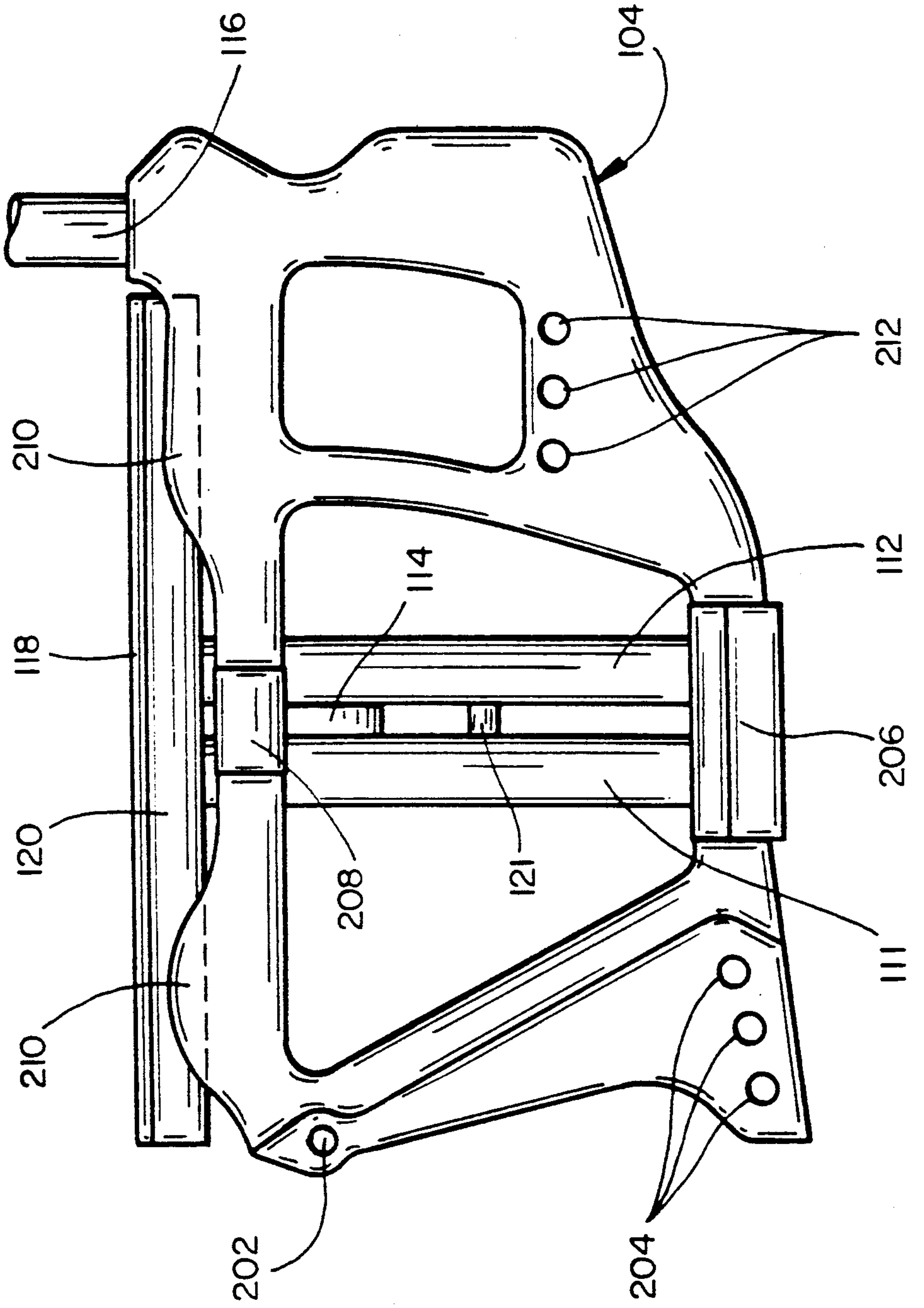
FIG. 2 is a side view of the foldable wheelchair depicted in FIG. 1.
Figure 3:
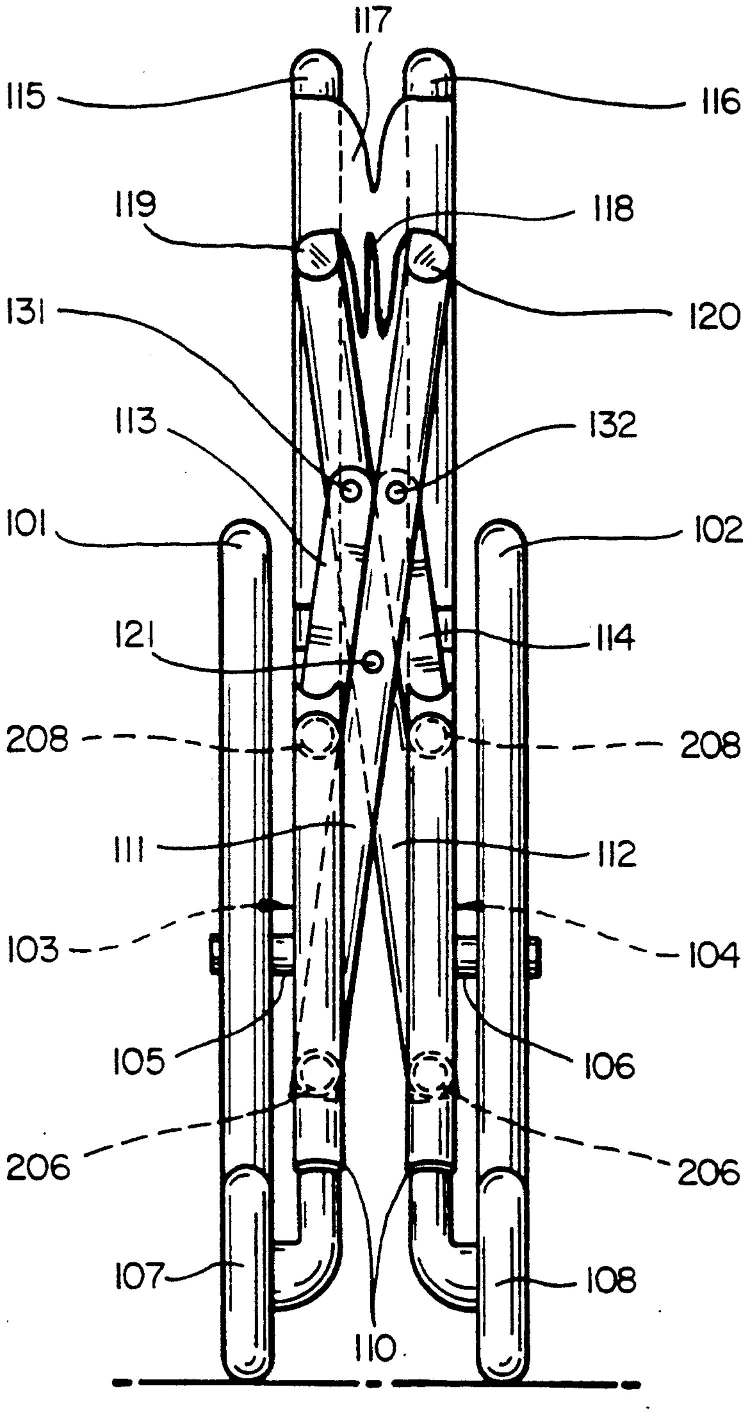
FIG. 3 is a front view of a foldable wheelchair in accordance with a preferred embodiment of the present invention as it appears in a folded configuration.

The present invention relates to a foldable wheelchair and a side frame assembly 103, 104 for a foldable wheelchair (FIGS. 1-3). The side frame assemblies 103, 104 are spaced opposite each other and provide support for drive wheels 101, 102, castors 107, 108, a seat assembly 118 and a backrest assembly 115, 116, 117. The two side frame assemblies 103, 104 are connected to each other by a folding mechanism.

The folding mechanism (FIGS. 1-3) includes a pair of shafts 111, 112 that are pivotally connected to each other at a pivot point 121 that is centrally located on each shaft. One of the shafts 111 is connected to a lower pivot attachment region of the side frame assembly 103 with a shaft sleeve 206 connected to one end of the shaft 111. The shaft 111 extends at an angle upwardly from the pivot attachment region, across the distance between the two side assemblies and is connected to an extruded tube 120 of the seat assembly. The other shaft 112 is connected to the side frame assembly 104 at a lower pivot attachment region with a shaft sleeve 206 connected to one end of the shaft 112. The other shaft 112 similarly extends at an angle upwardly from the lower pivot attachment region, across the distance between the two side assemblies, and is connected to a seat extrusion tube 119.

Also included in the folding mechanism are a pair of pivot links 113, 114. The first pivot link 113 is connected at an upper portion of one of the shafts 112 at a pivot point 131 and is connected to an upper middle pivot attachment region of the side frame assembly 103 with a shaft sleeve 208 fixed to one end of the first pivot link 113. Similarly, the second pivot link 114 is connected to an upper portion of one of the shafts 111 at a pivot point 132 and extends to an upper middle pivot attachment region of the side frame assembly 104 with a shaft sleeve 208 fixed to one end of the second pivot link 114.

For folding the wheelchair, the two sides of the wheelchair are urged inwardly towards each other such that the shafts 111, 112 pivot around pivot point 121 and pivot lengths 113, 114 pivot around pivot points 131, 132, respectively. Through shaft sleeve 208, the pivot links 113, 114 also rotate into an upwardly extending position and thereby guide the movement of the shafts 111, 112 into the folded configuration (FIG. 3).

The seat assembly includes a pair of extruded tubes 119, 120 that rest on an upper region of the side frame assemblies 103, 104 when the wheelchair is unfolded. Spanning between the two extruded tubes 119, 120 is a nylon seat sling 120. (FIG. 1). The seat sling 120 is secured in each extruded tube 119, 120 by being wrapped around a dowel 802 that is insertable along the length of each extruded tube 119, 120.

Each side frame assembly 103, 104 for a foldable wheelchair is substantially identical. Hence, the subsequent description will refer only to one side frame assembly 104. It is appreciated that identical features are present on the opposite side frame assembly 103. In fact, the side frames 103, 104 are completely interchangeable and may be used as either side of the foldable wheelchair.

A forward region of the side frame assembly 104 serves to attach and support a castor frame piece 110 (FIGS. 2 and 4) which is connected to a side frame assembly 104 at two locations. One location is the pivot point 202 disposed at an upper forward region of the side frame assembly 104. The other location is at any of a plurality of holes 204 disposed at a lower forward region of the side frame assembly 104. The sideframe assembly 104 will freely pivot around the castor frame piece at pivot point 202 according to the selection of the holes 204.

The castor frame piece includes leg rest receiving lugs 460 supporting a leg rest and a castor receptacle 462. The lugs 460 and receptacle 462 are positioned along an axis that is at a right angle with the travelling surface.

The selection of a hole 204 to secure the lower portion of the castor frame piece 110 to the side assembly 104 dictates the relative angular position of the side frame assembly 104 to the castor frame piece 110. Therefore, the selection of a hole 204 will dictate the ultimate seat angle relative to the traveling surface for the user. Since the pivot point 202 is disposed at the upward forward region of the side assembly 104, any change in seat angle has only a minimal effect on the rotational distance between the seat sling 118 and leg rest mounted on the castor frame piece 110. Consequently, any of a number of seat angles may be chosen without needing to also adjust the leg rest. In fact, in this manner, the leg rest and castor assembly stay fixed in space during all changes of seat angle.

The drive wheel 102 is attached by way of axle 106 to a rearward region of the side frame assembly 104. The axle 106 may be received in any of a plurality of axle receiving holes 212. The holes 212 are located at various lateral and vertical position and in the rearward region of the side assembly 104. Hence, the wheel 102 is easily attached to the side frame assembly 104 according to any of a number of positions to obtain a desired center of gravity and seat angle and height. When a wheel 102 is attached at the forward most hole 212, the resulting seat pan angle is about 3°.

In one embodiment, further adjustability to the location of attachment of the drive wheel 102 may be obtained through the use of an axle plate 450 that may be bolted at various positions on the side frame assembly 104 at bolt points 222. (FIG. 4) The axle plate would include a series of axle receiving holes 212, any of which could be suitable to receive the axle 106 of the drive wheel 102. The axle plate 450 can be secured at any of a set of the bolt points 222 positioned along the side frame assembly. The sets of bolt points 222 are disposed on the side frame assembly 104 along arcs whose radii originate from the pivot point 202. Consequently, the seat pan angle can be adjusted while maintaining a desired center of gravity according to placement of the axle plate 450 in the proper bolt points 222. This gives further adjustability to the seat angle and seat height.

Figure 7:
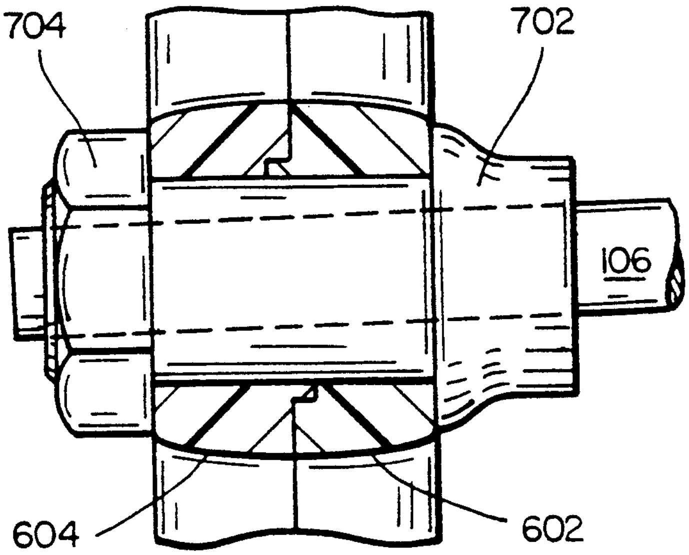
FIG. 7 is a cross-sectional view of one of the side frame assemblies illustrating a camber plug that can be employed to receive and mount the drive wheel axle.
Figure 8:
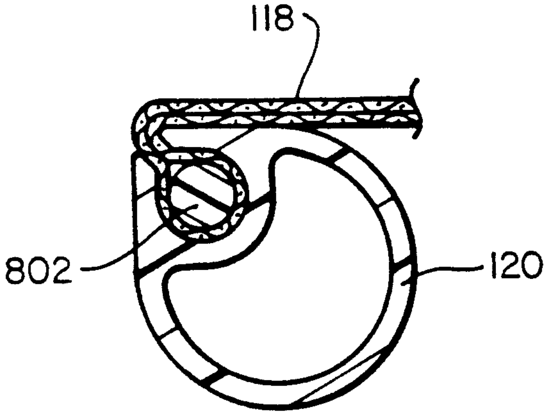
FIG. 8 is a cross-sectional view of the side frame assembly and seat assembly illustrating the way in which the seal sling can be mounted on the side frame assemblies.

In another embodiment, the holes 212 of the side assembly 104 may be sized so as to receive a camber plug 702 (FIG. 7). The camber plug 702 is secured in the hole 212 by a nut 704 and would be sized to receive the axle 106. A plurality of camber plugs 702 are available, each of which receiving the axle 106 at a different angle relative to the axis of hole 112, and thereby enabling the drive wheel 102 to be attached at any of a variety of wheel camber angles.

Figure 4:
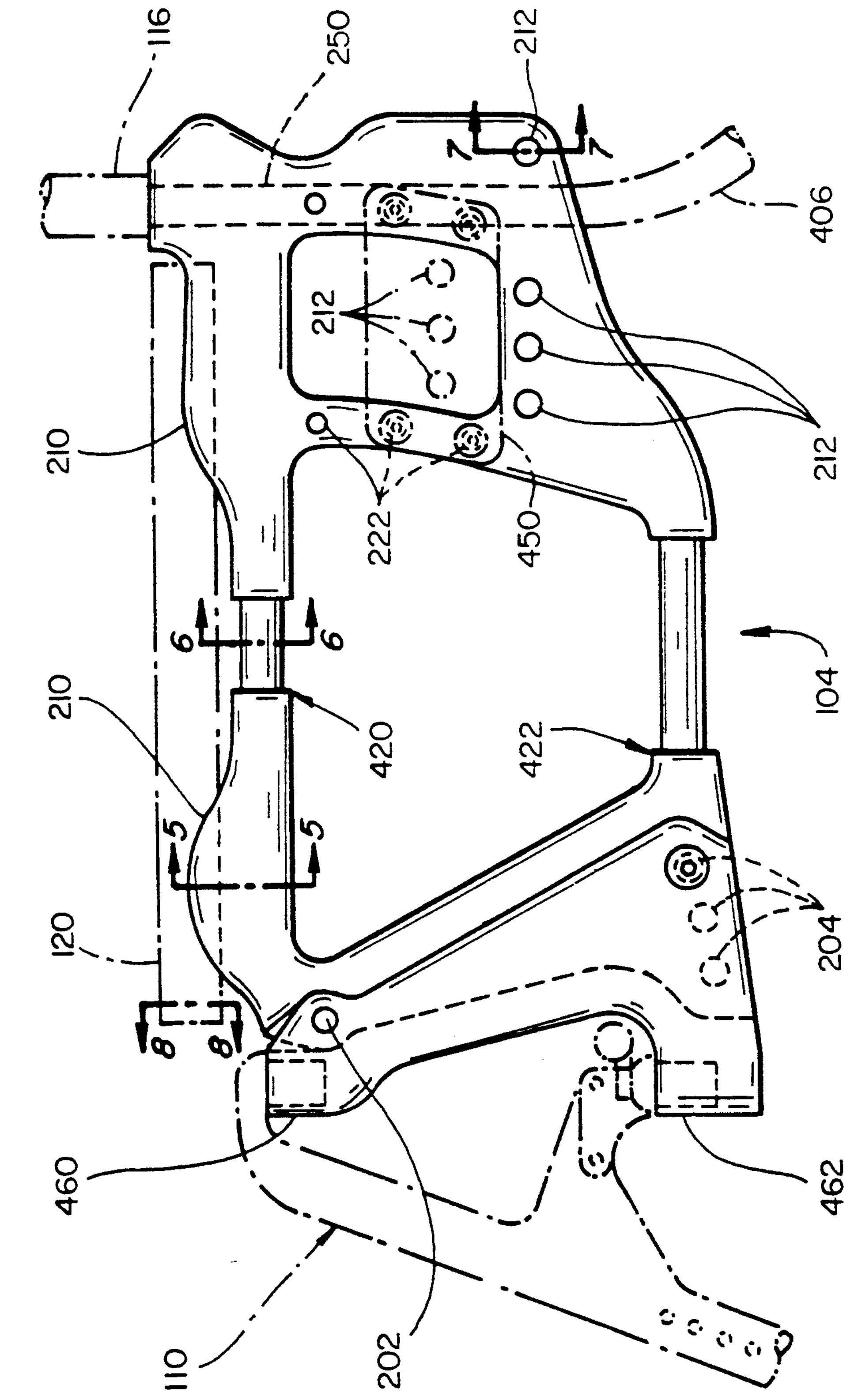
FIG. 4 is a side view of a side frame assembly of a foldable wheelchair in accordance with a preferred embodiment of the present invention.

The rearward region of the side frame assembly 104 also includes a cylindrically shaped opening that extends substantially the height of the rearward region of the side assembly 104 (FIG. 4). In one embodiment, the opening 250 extends the entire height of the rearward region of the side assembly 104. The opening 250 receives a tube 116 for the backrest of the wheelchair. In the embodiment where the opening 250 extends the entire length of the rearward region, an anti-tip tube 406 may be inserted into the opening 250 from the bottom of the side frame assembly 104 and received within the backrest support tube 116.

The side frame assembly 104 includes an upper middle pivot attachment region for receiving the shaft sleeve 208 of one of the pivot links 114 of the folding mechanism. The side frame assembly 104 also includes a lower middle pivot attachment region for receiving the shaft sleeve 206 of one of the shafts 112 of the folding mechanism. The shaft sleeves 206, 208 may freely rotate about the upper and lower middle pivot attachment regions, respectively, so that the wheelchair is easily adjusted into the foldable condition.

Figure 6:
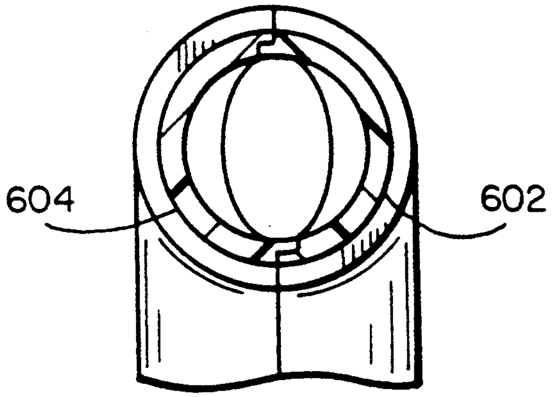
FIG. 6 is a cross-sectional view taken along the lines 6—6 of the side frame assembly of FIG. 4.

The side frame assembly 104 is preferably constructed of two compression or injection molded halves 602, 604 of composite material that are bolted together at various locations. The two halves are shaped to create a tubular appearance (FIG. 6).

Figure 5:
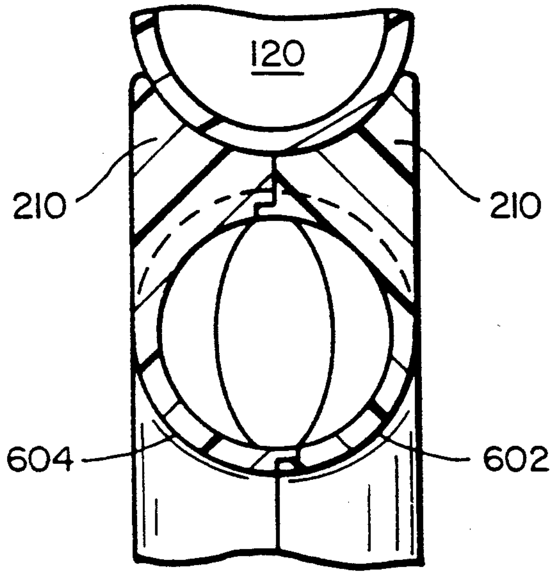
FIG. 5 is a cross-sectional view taken along the lines 5—5 of the side frame assembly of FIG. 4.

In order to support the extruded tube 120 of the seat assembly, an upper region of the side frame assembly 104 is molded to include contoured walls 210 (FIGS. 4 and 5) that form a cradle for receiving the extruded tube 120. Consequently, during use, the wheelchair will have added lateral stability.

In order to economically produce foldable wheelchairs of different chassis lengths, the mold for the side assembly 104 is designed so that by methods of blocking in the mold, different lengths of the side frame assembly 104 may be obtained. In particular, by providing a mold that may be blocked at one inch intervals at blocking points 420, 422 in a middle region of the side assembly 104, different lengths of side assemblies 104 may be obtained to provide a chassis having a length anywhere from 16 inches to 20 inches.

The principals, preferred embodiments and modes of operation of the present invention have been described in the foregoing specification, however, the invention which is intended to be protected is not to be construed as limited to the particular embodiments disclosed. Further, the embodiments described herein are to be regarded as illustrative rather than restrictive. Variations and changes may be made by others without departing from the spirit of the present invention and it is expressly intended that all such variations and changes which fall within the spirit and scope of the present invention as defined in the claims, may be embraced thereby.

What is claimed is:

1. A side assembly of a wheelchair frame comprising:

means for receiving a drive wheel axle at any of a plurality of different locations in a rearward region of said side assembly such that a center of gravity of said wheelchair may be varied;

means for supporting a wheelchair seat assembly on said side assembly;

pivot means for pivotally attaching said side assembly to a caster frame piece so that the side assembly can pivot relative to the caster frame piece about a pivot point to change a seat angle relative to a surface; and means for adjusting the seat angle, said means for adjusting the seat angle including a plurality of holes for allowing a drive wheel to be mounted on the side assembly, said plurality of holes being disposed along an arc having a radius that originates at said pivot point.

2. A side assembly as set forth in claim 1, wherein said means for pivotally attaching said side assembly to a caster frame piece includes a pivot point disposed at an upper forward region of said side assembly and a plurality of angle adjustment holes disposed at a lower forward region of said side assembly, such that a desired seat angle is obtained by securing said side assembly to said caster frame piece at a desired adjustment hole and thereby securing said side assembly at a desired angle relative to said castor frame piece.

3. A side assembly as set forth in claim 1, wherein said side assembly is formed of two composite molded halves joined together.

4. A side assembly as set forth in claim 3, wherein said two composite molded halves are shaped such that said side assembly has the appearance of a tubular construction.

5. A side assembly as set forth in claim 3, wherein said means for supporting a wheelchair seat assembly includes molded-in contoured sides extending upward from said side assembly at two spaced apart locations along the side assembly, said contoured sides being shaped to form a U-shaped cradle for receiving a seat tube of a seat assembly.

6. A side assembly as set forth in claim 2, wherein said means for receiving a drive wheel axle includes an axle plate for being mounted on said rearward region of said side assembly, said axle plate including a plurality of openings for receiving said drive wheel axle.

7. A side assembly as set forth in claim 1, including an opening extending the height of said rearward region of said side assembly for receiving a seat back tube from a top of said side assembly.

8. A side assembly as set forth in claim 3, including a pair of pivot attachment regions for attaching a folding mechanism to said side assembly, one of said pair of pivot attachment regions being disposed at an upper middle region of said side assembly, the other of said pair of pivot attachment regions being disposed at a lower middle region of said side assembly,

9. A side assembly as set forth in claim 1, wherein said means for receiving a drive wheel axle includes a plurality of holes for receiving any of a plurality of wheel plugs so as to accommodate a plurality of wheel camber angles.

10. A side assembly as set forth in claim 7, wherein said opening extends through a bottom of said side assembly and is sized to receive an anti-tip tube from the bottom of said side assembly.

11. A wheelchair comprising:

a pair of side frame assemblies;

a seat assembly spanning a distance between said pair of side frame assemblies, said seat assembly including a seat on which an individual can sit, said seat being positioned relative to a surface on which said wheelchair is to be placed to define a seat angle;

each of said side frame assemblies including means for supporting said seat assembly;

connecting means extending between and connecting said pair of side frame assemblies to one another; and means for varying the seat angle, said means for varying the seat angle including a plurality of holes arranged on each side frame assembly for allowing a drive wheel to be mounted on each side frame assembly, the holes in each side frame assembly being arranged along an arc having a radius that originates from a predetermined point.

12. A wheelchair as set forth in claim 11, wherein said pair of side frame assemblies are formed of two composite molded halves joined together.

13. A wheelchair as set forth in claim 11, wherein said seat is a flexible seat-sling and wherein said seat assembly includes a pair of extruded tubes, each of said tubes having means for retaining the flexible seat sling extending between said pair of extruded tubes.

14. A wheelchair as set forth in claim 11, wherein said means for supporting said seat assembly includes molded-in contoured sides extending upward from each of said side frame assemblies at two spaced part locations along the respective side frame assemblies, said contoured sides being shaped to form a U-shaped cradle for receiving said extruded tubes of said seat assembly.

15. A wheelchair as set forth in claim 11, wherein said connecting means includes folding means for folding said wheelchair.

16. A wheelchair as set forth in claim 11, including a caster frame piece pivotally connected to each of said side frame assemblies such that an angle of said seat assembly is changed according to a pivoting adjustment of said side frame assemblies relative to said castor frame piece.

17. A wheelchair as set forth in claim 11, including a caster frame piece pivotally connected to each of said side frame assemblies at said predetermined point which is disposed at a forward and upward region of the respective side frame assembly, said caster frame piece being pivotable about said predetermined point relative to the side frame assembly to which the castor frame piece is attached.

18. A wheelchair as set forth in claim 11, wherein said means for supporting said seat assembly is disposed at a top region of each of said side frame assemblies.

19. A wheelchair as set forth in claim 11, including means for receiving a drive wheel axle at any of a plurality of different locations such that a center of gravity of said wheelchair may be varied.

20. A wheelchair as set forth in claim 11, including an axle plate mountable on each side frame assembly at one of a plurality of positions defined by said plurality of holes.

21. A wheelchair according to claim 19, wherein said means for receiving a drive wheel axle includes an axle plate mountable in said rearward region of each side frame assembly at a plurality of locations defined by said holes, said axle plate having a plurality of openings for receiving said drive wheel axle.

22. A wheelchair according to claim 21, wherein said plurality of openings in each axle plate are sized to receive any of a plurality of wheel camber plugs, each of said wheel camber plugs being shaped to provide a different wheel camber angle.

23. A wheelchair according to claim 12, wherein said two composite molded halves are shaped such that said side frame assemblies have the appearance of a tubular construction.

24. A wheelchair as set forth in claim 11, wherein said plurality of holes includes two series of holes located in the rearward region of each side frame assembly for mounting an axle plate that is adapted to receive a drive wheel axle at one of a plurality of locations.

25. A wheelchair according to claim 11, wherein each of said side frame assemblies includes first and second pivot attachment regions for connecting said side frame assemblies to said connecting means, said first pivot attachment region being disposed at a lower middle region of said side assembly, said connecting means including a pair of shafts connected to each other at a common pivot point centrally located on said shafts, one of said shafts being attached to the first pivot attachment region of a side frame assembly and extending across the distance between said pair of side frame assemblies to one side of the seat assembly, the other of said shafts being pivotally attached to the first pivot attachment region of the other side frame assembly and extending across the distance between the pair of side frame assemblies to an opposite side of the seat assembly, and including a pair of pivot links, each pivot link being pivotally attached to the second pivot attachment region of a respective side assembly and extending to one of said shafts.

* * * * *